United States Patent
Akada et al.

(10) Patent No.: US 11,674,193 B2
(45) Date of Patent: *Jun. 13, 2023

(54) CANTED COIL SPRING AND CONNECTOR

(71) Applicant: Sumitomo Electric Industries, Ltd., Osaka (JP)

(72) Inventors: Takumi Akada, Osaka (JP); Hiromu Izumida, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 311 days.

This patent is subject to a terminal disclaimer.

(21) Appl. No.: 16/616,360

(22) PCT Filed: Mar. 13, 2018

(86) PCT No.: PCT/JP2018/009631
§ 371 (c)(1),
(2) Date: Nov. 22, 2019

(87) PCT Pub. No.: WO2018/216317
PCT Pub. Date: Nov. 29, 2018

(65) Prior Publication Data
US 2020/0080166 A1   Mar. 12, 2020

(30) Foreign Application Priority Data

May 25, 2017 (JP) .............................. JP2017-103968

(51) Int. Cl.
*F16F 1/04* (2006.01)
*C21D 9/02* (2006.01)
(Continued)

(52) U.S. Cl.
CPC .............. *C21D 9/02* (2013.01); *B32B 15/015* (2013.01); *B32B 15/18* (2013.01); *B32B 15/20* (2013.01);
(Continued)

(58) Field of Classification Search
None
See application file for complete search history.

(56) References Cited

U.S. PATENT DOCUMENTS

| 5,240,520 A | * | 8/1993 | Tarui | ....................... C22C 38/18 |
| | | | | 428/677 |
| 6,372,056 B1 | * | 4/2002 | Kuroda | ..................... C21D 8/06 |
| | | | | 148/320 |

(Continued)

FOREIGN PATENT DOCUMENTS

| CN | 1272890 A | 11/2000 |
| EP | 1 018 565 A1 | 7/2000 |

(Continued)

OTHER PUBLICATIONS

Prater Industries, "Hardness of Materials" and "Comparison of Hardness Values", (no date), accessed at praterindustries.com on Dec. 1, 2021. (Year: 2021).*

(Continued)

*Primary Examiner* — Seth Dumbris
*Assistant Examiner* — Kim S. Horger
(74) *Attorney, Agent, or Firm* — Baker Botts, L.L.P.; Michael A. Sartori

(57) ABSTRACT

A canted coil spring includes a core wire 10 formed of steel having a pearlite structure; and a copper plating layer 20 formed of copper or a copper alloy and covering an outer circumferential surface 11 of the core wire 10. The steel contains 0.5 mass % or more and 1.0 mass % or less carbon, 0.1 mass % or more and 2.5 mass % or less silicon, and 0.3 mass % or more and 0.9 mass % or less manganese, with the balance being iron and inevitable impurities. The copper plating layer 20 has a crystallite size of 220±50 Å.

17 Claims, 9 Drawing Sheets

(51) Int. Cl.

| | |
|---|---|
| *C22C 38/44* | (2006.01) |
| *C22C 38/46* | (2006.01) |
| *C25D 3/38* | (2006.01) |
| *B32B 15/18* | (2006.01) |
| *B32B 15/20* | (2006.01) |
| *B32B 15/01* | (2006.01) |
| *C25D 5/12* | (2006.01) |
| *C22C 38/00* | (2006.01) |
| *C22C 38/04* | (2006.01) |
| *F16F 1/02* | (2006.01) |
| *C23C 28/02* | (2006.01) |
| *C21D 8/06* | (2006.01) |

(52) U.S. Cl.
CPC .............. *C22C 38/00* (2013.01); *C22C 38/04* (2013.01); *C22C 38/44* (2013.01); *C22C 38/46* (2013.01); *C25D 3/38* (2013.01); *C25D 5/12* (2013.01); *F16F 1/021* (2013.01); *F16F 1/045* (2013.01); *C21D 8/06* (2013.01); *C21D 2211/009* (2013.01); *C23C 28/023* (2013.01)

(56) References Cited

U.S. PATENT DOCUMENTS

| | | |
|---|---|---|
| 11,186,902 B2 | 11/2021 | Akada et al. |
| 11,459,644 B2 | 10/2022 | Akada et al. |
| 2007/0232154 A1 | 10/2007 | Zhao et al. |
| 2010/0029145 A1 | 2/2010 | Balsells et al. |
| 2019/0154096 A1 | 5/2019 | Izumida |
| 2020/0056671 A1 | 2/2020 | Akada et al. |
| 2021/0079505 A1 | 3/2021 | Akada et al. |
| 2021/0164083 A1 | 6/2021 | Akada et al. |

FOREIGN PATENT DOCUMENTS

| | | |
|---|---|---|
| JP | 61-151914 A | 7/1986 |
| JP | H04-107331 A | 4/1992 |
| JP | H04-187335 A | 7/1992 |
| JP | H06-158353 A | 6/1994 |
| JP | 2000-345294 A | 12/2000 |
| JP | 2001-180337 A | 7/2001 |
| JP | 2002-178077 A | 6/2002 |
| JP | 2002-254108 A | 9/2002 |
| JP | 2004-149816 A | 5/2004 |
| JP | 2009-001872 A | 1/2009 |
| JP | 2010-070783 A | 4/2010 |
| JP | 2012-525555 A | 10/2012 |
| JP | 2012-248495 A | 12/2012 |
| JP | 2012-251235 A | 12/2012 |
| JP | 2013-081982 A | 5/2013 |
| JP | 2015-030071 A | 2/2015 |
| WO | 2010/129293 A2 | 11/2010 |
| WO | 2012/085651 A1 | 6/2012 |
| WO | 2017/212770 A1 | 12/2017 |

OTHER PUBLICATIONS

MatWeb, "Overview of Materials for Brass", accessed on Apr. 27, 2022 at matweb.com (Year: 2022).*

Office Action in U.S. Appl. No. 16/492,895, dated Aug. 12, 2020.

Office Action issued in U.S. Appl. No. 16/308,674, dated Mar. 9, 2021.

Office Action in U.S. Appl. No. 16/308,674, dated Nov. 27, 2020.

Final Office Action issued in U.S. Appl. No. 16/492,895 dated Apr. 22, 2021.

Advisory Action issued in U.S. Appl. No. 16/492,895 dated Jul. 6, 2021.

Non-Final Office Action issued in U.S. Appl. No. 16/492,895 dated Jul. 30, 2021.

Notice of Allowance issued in U.S. Appl. No. 16/492,895 dated Sep. 30, 2021.

Hardness Table, www.praterindustires.com, (no date), downloaded Aug. 2, 2020 (three pages) (Year: 2020).

Comparison of Material Between Hardness (MOHS) and Vickers Hardness or Rockwell "C" Scales, www.roslerblog.com, (Feb. 2016), downloaded on Aug. 2, 2020 (three pages). (Year: 2016).

SWRS72A Datasheet, downloaded www.steeljis.com, (no date), downloaded on Aug. 2, 2020 (1 page). (Year: 2020).

Restriction Requirement issued in U.S. Appl. No. 16/965,420 dated Feb. 25, 2022.

Non-Final Office Action issued in U.S. Appl. No. 16/965,420 dated Apr. 28, 2022.

Notice of Allowance issued in U.S. Appl. No. 16/965,420 dated Aug. 8, 2022.

* cited by examiner

CANTED COIL SPRING AND CONNECTOR

TECHNICAL FIELD

The present invention relates to a canted coil spring and a connector.

This application claims priority to Japanese Patent Application No. 2017-103968 filed May 25, 2017, which is incorporated herein by reference in its entirety.

BACKGROUND ART

A canted coil spring which is a coil spring having a wire material (metal wire) coiled so as to be canted with respect to the face perpendicular to the axial direction is known (see, for example, PTL 1). A canted coil spring undergoes a substantially constant spring load against displacement in a certain range in the direction perpendicular to the axial direction (i.e., canted coil springs have non-linearity). A canted coil spring made of an electrically conductive material can be used as, for example, a component of a connector. For example, a zirconium-copper alloy can be used as a material of the canted coil spring.

CITATION LIST

Patent Literature

PTL 1: Japanese Unexamined Patent Application Publication No. 4-107331

SUMMARY OF INVENTION

A canted coil spring according to the present invention includes a core wire formed of steel having a pearlite structure; and a copper plating layer formed of copper or a copper alloy and covering an outer circumferential surface of the core wire. The steel contains 0.5 mass % or more and 1.0 mass % or less carbon, 0.1 mass % or more and 2.5 mass % or less silicon, and 0.3 mass % or more and 0.9 mass % or less manganese, with the balance being iron and inevitable impurities. The copper plating layer has a crystallite size of 220±50 Å.

DESCRIPTION OF EMBODIMENTS

Figure 1:
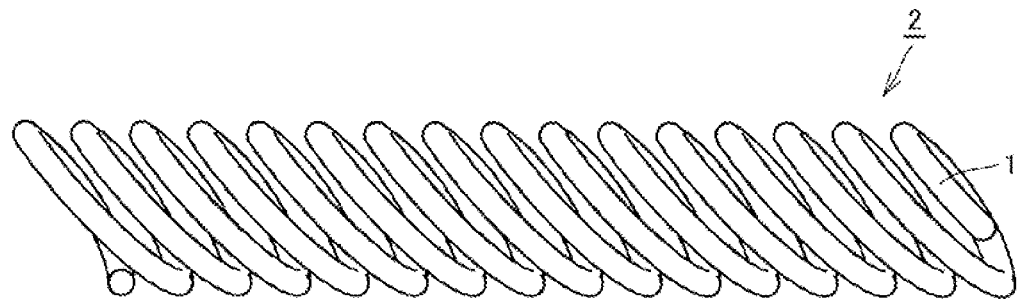
FIG. 1 is a schematic view illustrating the structure of a canted coil spring.

Problems to be Solved by Present Disclosure

A canted coil spring used as a component of a connector is required to have both settling resistance and conductivity. If a zirconium-copper alloy is used as a material of the canted coil spring, the canted coil spring may fail to satisfy such a requirement.

An object of the present invention is to provide a canted coil spring that has both settling resistance and conductivity and to provide a connector including the canted coil spring.

Advantageous Effects of Present Disclosure

The canted coil spring has both settling resistance and conductivity.

Description of Embodiments of Present Invention

First, embodiments of the present invention will be specifically described. A canted coil spring according to one aspect of the present invention includes a core wire formed of steel having a pearlite structure; and a copper plating layer formed of copper or a copper alloy and covering the outer circumferential surface of the core wire. The steel contains 0.5 mass % or more and 1.0 mass % or less carbon, 0.1 mass % or more and 2.5 mass % or less silicon, and 0.3 mass % or more and 0.9 mass % or less manganese, with the balance being iron and inevitable impurities. The copper plating layer has a crystallite size of 220±50 Å (22±50 nm).

The canted coil spring according to one aspect of the present invention includes a high-strength core wire formed of steel having a pearlite structure and having a suitable composition. This configuration can ensure high settling resistance. The outer circumferential surface of the core wire is covered with a copper plating layer formed of copper or a copper alloy. The copper plating layer has a crystallite size of 220±50 Å.

According to the studies carried out by the inventors of the present invention, the conductivity is not high enough if the copper plating layer has a crystallite size of less than 170 Å. To obtain a copper plating layer having a crystallite size of less than 170 Å, the temperature of the heat treatment for relieving strain introduced in the step (coiling step) of coiling a spring-wire material cannot be increased sufficiently. Thus, a large amount of stain remains in the canted coil spring, and the resistance is not reduced sufficiently even if the load under which the canted coil spring is pressed against the terminals is increased. If the copper plating layer has a crystallite size of more than 270 Å, the conductivity is not high enough. To obtain a copper plating layer having a crystallite size of more than 270 Å, the temperature of the heat treatment needs to be high, and the oxidation of the surface and the diffusion of iron from the core wire to the copper plating layer result in low conductivity. In addition, the resistance when the canted coil spring is pressed against the terminals under a predetermined load is increased due to the decrease of hardness. When the copper plating layer has a crystallite size of 170 Å or more and 270 Å or less, the conductivity is high enough.

As described above, the canted coil spring of the present invention including high-strength core wire made of steel and having a copper plating layer having a crystallite size of 220±50 Å has both settling resistance and conductivity.

In the canted coil spring, the copper plating layer may have a lattice strain of −0.085±0.015%. When the copper plating layer has a lattice strain in this range, it is easy to ensure high conductivity.

In the canted coil spring, the copper plating layer may have a hardness of 75 HV or more and 130 HV or less. When the copper plating layer has a hardness in this range, it is easy to ensure high conductivity.

In the canted coil spring, the steel may further contain one or more elements selected from the group consisting of 0.1 mass % or more and 0.4 mass % or less nickel, 0.1 mass % or more and 1.8 mass % or less chromium, 0.1 mass % or more and 0.4 mass % or less molybdenum, and 0.05 mass % or more and 0.3 mass % or less vanadium. Even when a core wire formed of steel having such a composition is used, both settling resistance and conductivity can be obtained.

The reasons for limiting the composition of the steel constituting the core wire to the above range will be described.

Carbon (C): 0.5 Mass % or More and 1.0 Mass % or Less

Carbon is an element that has a large effect on the strength and elastic limit of steel having a pearlite structure. To obtain strength and elastic limit sufficient for a core wire of a canted coil spring-wire material, the carbon content needs to be 0.5 mass % or more. A high carbon content results in low toughness and may make processing difficult. To ensure sufficient toughness, the carbon content needs to be 1.0 mass % or less. To further improve strength and elastic limit, the carbon content is preferably 0.6 mass % or more, and more preferably 0.8 mass % or more. To improve toughness to facilitate processing, the carbon content is preferably 0.95 mass % or less.

Silicon (Si): 0.1 Mass % or More and 2.5 Mass % or Less

Silicon is an element to be added as a deoxidizing agent in the steel refining process. To exert a function as a deoxidizing agent, the silicon content needs to be 0.1 mass % or more and is preferably 0.12 mass % or more. Silicon functions as a carbide generating element in the steel and suppresses softening caused by heating (has softening resistance). To suppress softening in the strain relieving heat treatment after coiling the wire material, the silicon content is preferably 0.8 mass % or more, and may be 1.8 mass % or more. The addition of excess silicon degrades toughness. To ensure sufficient toughness, the silicon content needs to be 2.5 mass % or less, preferably 2.3 mass % or less, or may be 2.2 mass % or less. When toughness is considered important, the silicon content may be 1.0 mass % or less.

Manganese (Mn): 0.3 Mass % or More and 0.9 Mass % or Less

Like silicon, manganese is an element to be added as a deoxidizing agent in the steel refining process. To exert a function as a deoxidizing agent, the manganese content needs to be 0.3 mass % or more.

The addition of excess manganese degrades toughness and workability in hot working. Therefore, the manganese content needs to be 0.9 mass % or less.

Inevitable Impurities

In the process of manufacturing the core wire, the steel constituting the core wire is inevitably contaminated with phosphorus (P) and sulfur (S). The presence of excess phosphorus and excess sulfur causes grain boundary segregation or generates inclusions to degrade the characteristics of the steel. Therefore, the phosphorus content and the sulfur content are both preferably 0.025 mass % or less. The total amount of inevitable impurities is preferably 0.3 mass % or less.

Nickel (Ni): 0.1 Mass % or More and 0.4 Mass % or Less

The addition of nickel prevents or reduces wire disconnection in the core-wire drawing process and the wire material coiling process. To exert this function assuredly, 0.1 mass % or more nickel may be added. Even if more than 0.4 mass % nickel is added, the above effect of nickel is saturated. The addition of more than 0.4 mass % nickel, which is an expensive element, increases costs for manufacturing the core wire. Therefore, the amount of nickel added is preferably 0.4 mass % or less.

Chromium (Cr): 0.1 Mass % or More and 1.8 Mass % or Less

Chromium functions as a carbide generating element in the steel and contributes to softening suppression during heating and to metal structure refinement resulting from generation of fine carbides. To exert such an effect assuredly, the amount of chromium added may be 0.1 mass % or more, or 0.2 mass % or more, or may be 0.5 mass % or more. The addition of excess chromium leads to a decrease in toughness. Therefore, the amount of chromium added is preferably 1.8 mass % or less. The above effect exerted by addition of chromium becomes marked when chromium is present together with silicon and vanadium. Therefore, chromium is preferably added together with these elements.

Molybdenum (Mo): 0.1 Mass % or More and 0.4 Mass % or Less

The addition of molybdenum can increase the elastic limit. To exert this function assuredly, 0.1 mass % or more molybdenum may be added. Even if more than 0.4 mass % molybdenum is added, the above effect of molybdenum is saturated. The addition of more than 0.4 mass % molybdenum, which is an expensive element, increases costs for manufacturing the core wire. Therefore, the amount of molybdenum added is preferably 0.4 mass % or less.

Vanadium (V): 0.05 Mass % or More and 0.3 Mass % or Less

Vanadium functions as a carbide generating element in the steel and contributes to softening suppression during heating and to metal structure refinement resulting from generation of fine carbides. To exert this function assuredly, 0.05 mass % or more vanadium may be added. The addition of excess vanadium leads to a decrease in toughness. To ensure sufficient toughness, the amount of vanadium added is preferably 0.3 mass % or less. The above effect exerted by addition of vanadium becomes marked when vanadium is present together with silicon and chromium. Therefore, vanadium is preferably added together with these element.

In the canted coil spring, the silicon content of the steel may be 1.35 mass % or more and 2.3 mass % or less. When the silicon content is 1.35 mass % or more, it is possible to suppress softening in the strain relieving heat treatment. When the silicon content is 2.3 mass % or less, it is possible to suppress a decrease in toughness.

In the canted coil spring, the steel may contain 0.6 mass % or more and 1.0 mass % or less carbon, 0.12 mass % or more and 0.32 mass % or less silicon, and 0.3 mass % or more and 0.9 mass % or less manganese, with the balance being iron and inevitable impurities.

In the canted coil spring, the steel may contain 0.6 mass % or more and 1.0 mass % or less carbon, 0.7 mass % or more and 1.0 mass % or less silicon, and 0.3 mass % or more and 0.9 mass % or less manganese, with the balance being iron and inevitable impurities.

In the canted coil spring, the steel may contain 0.55 mass % or more and 0.7 mass % or less carbon, 1.35 mass % or more and 2.3 mass % or less silicon, 0.3 mass % or more and 0.9 mass % or less manganese, 0.2 mass % or more and 1.8 mass % or less chromium, and 0.05 mass % or more and 0.30 mass % or less vanadium, with the balance being iron and inevitable impurities.

A large non-linear region can be obtained more assuredly by using steel having such a composition as the steel constituting the core wire.

The canted coil spring may further include a hard layer disposed on the outer circumferential side of the copper plating layer and having a higher hardness than the copper plating layer.

During the use of the canted coil spring, the stress that increases toward the outer circumferential surface is repeatedly applied to the canted coil spring. According to the studies carried out by the inventors of the present invention, the repeatedly acting stress may cause fatigue fracture in the copper plating layer to cause a decrease in conductivity. When the hard layer having a higher hardness than the copper plating layer is disposed on the outer circumferential side of the copper plating layer, that is, on the side on which a larger stress acts, it is possible to suppress a decrease in conductivity due to fatigue fracture of the copper plating layer. As a result, stable conductivity can be achieved.

In the canted coil spring, the hard layer may be a plating layer. In this case, it is easy to form the hard layer.

In the canted coil spring, the hard layer may be a nickel layer or a chromium layer. The material of the hard layer may be nickel or chromium, which has high strength and high conductivity. The hard layer is particularly preferably a nickel layer. When the hard layer is a nickel layer, it is easy to form a gold layer or a silver layer as a plating layer on the hard layer.

In the canted coil spring, the hard layer may have a hardness of 300 HV or more. In this case, stable conductivity can be achieved more assuredly.

In the canted coil spring, the hardness of the hard layer may be 50 HV or more higher than the hardness of the copper plating layer. In this case, stable conductivity can be achieved more assuredly. The hardness of the hard layer may be equal to or lower than the hardness of the core wire.

In the canted coil spring, the ratio of the thickness of the hard layer to the thickness of the copper plating layer may be 1/10 or more and less than 1.

When the ratio is 1/10 or more, stable conductivity can be achieved more assuredly. When the ratio is less than 1, the decrease of production efficiency can be avoided. When a plating layer is used as the hard layer and the ratio is less than 1, it is possible to suppress a decrease in toughness due to invasion of hydrogen during hard layer formation. The ratio is preferably 1/3 or more. The ratio is preferably 3/4 or less.

In the canted coil spring, an alloy region containing a metal element that constitutes the copper plating layer and a metal element that constitutes the hard layer may be formed between the copper plating layer and the hard layer. In this case, a canted coil spring in which the copper plating layer is strongly bonded to the hard layer can be obtained.

In the canted coil spring, the hard layer may be a nickel layer, and the alloy region may contain copper and nickel. In this case, a canted coil spring in which the copper plating layer is strongly bonded to the hard layer can be obtained.

The canted coil spring may have a conductivity of 15% IACS (International Annealed Copper Standard) or more ($3.87 \times 10^8 / \Omega \cdot m$ or more) and 50% IACS or less ($1.29 \times 10^9 / \Omega \cdot m$ or less). In this case, a canted coil spring suitable for a component of a connector can be obtained.

The canted coil spring may further include a gold layer, a silver layer, or a tin layer on the surface of the canted coil spring. In this case, the contact resistance of the canted coil spring when it is used as a component of a connector can be reduced.

In the canted coil spring, the oxygen concentration in the interface between the core wire and the copper plating layer may be 10 mass % or less. In this case, a large non-linear region can be obtained more assuredly.

In the canted coil spring, the copper plating layer may have a thickness of 10 μm or more and 65 μm or less. When the copper plating layer has a thickness of 10 μm or more, it is easy to obtain sufficient conductivity. When the copper plating layer has a thickness of 65 μm or less, it is easy to obtain high strength and high elastic limit. As a result, it is easy to obtain a large non-linear region. The copper plating layer may have a thickness of 50 μm or less in order to obtain a larger non-linear region.

In the canted coil spring, the core wire may have a diameter of 0.05 mm or more and 2.0 mm or less. In this case, it is easy to obtain sufficient settling resistance.

A connector according to one aspect of the present invention includes: a first terminal; a second terminal spaced apart from the first terminal; and the canted coil spring disposed between the first terminal and the second terminal in such a manner that the canted coil spring is in contact with the first terminal and the second terminal. In the connector according to one aspect of the present invention, the first terminal and the second terminal are electrically coupled to each other through the canted coil spring according to one aspect of the present invention having both settling resistance and conductivity. In the connector of the present invention, the canted coil spring stably absorbs changes in the distance between the first terminal and the second terminal and forms an electrical coupling between the first terminal and the second terminal with low resistance.

Detailed Description of Embodiments of Present Invention

Next, embodiments of a canted coil spring and a connector according to the present invention will be described below with reference to the drawings. In the following drawings, any identical or corresponding parts will be assigned with the same reference characters, and no redundant description thereof will be provided.

Referring to FIG. 1, a canted coil spring 2 according to an embodiment is formed of a canted coil spring-wire material 1 according to an embodiment. The canted coil spring 2 is a helical spring and has the canted coil spring-wire material 1 coiled so as to be canted with respect to the face perpendicular to the axial direction. The canted coil spring 2 is used so as to undergo a load in the direction perpendicular to the axial direction.

Figure 2:
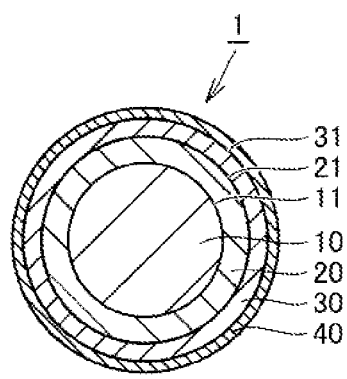
FIG. 2 is a schematic cross-sectional view illustrating the cross section, perpendicular to the longitudinal direction, of a wire material constituting the canted coil spring.

Referring to FIG. 1 and FIG. 2, the canted coil spring 2 (canted coil spring-wire material 1) according to the embodiment includes a core wire 10, a copper plating layer 20, a hard layer 30, and a surface layer 40. The core wire 10 is formed of steel having a pearlite structure. The copper plating layer 20 covers an outer circumferential surface 11 of the core wire 10 and is disposed in contact with the outer circumferential surface 11. The copper plating layer 20 is formed of copper or a copper alloy. The copper alloy may be, for example, a copper alloy with at least one metal selected from the group consisting of zinc, tin, phosphorus, and iron. The copper plating layer 20 has a crystallite size of 220±50 Å.

The hard layer 30 is disposed on the outer circumferential side of the copper plating layer 20. The hard layer 30 is disposed in contact with an outer circumferential surface 21 of the copper plating layer 20 so as to cover the outer circumferential surface 21. The hardness of the hard layer 30 is higher than the hardness of the copper plating layer 20.

The surface layer 40 is disposed on the outer circumferential side of the hard layer 30. The surface layer 40 is disposed in contact with an outer circumferential surface 31 of the hard layer 30 so as to cover the outer circumferential surface 31. The surface layer 40 is disposed so as to include the outer circumferential surface of the canted coil spring-wire material 1. In other words, the surface layer 40 is disposed in the outermost layer of the canted coil spring-wire material 1. The surface layer 40 is a gold layer, a silver layer, or a tin layer. The canted coil spring-wire material 1 has a circular cross section perpendicular to the longitudinal direction.

The steel constituting the core wire 10 contains 0.5 mass % or more and 1.0 mass % or less carbon, 0.1 mass % or more and 2.5 mass % or less silicon, and 0.3 mass % or more and 0.9 mass % or less manganese, with the balance being iron and inevitable impurities.

Figure 3:
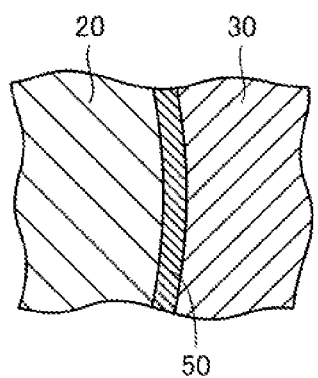
FIG. 3 is a schematic cross-sectional view illustrating the structure of a border region between the copper plating layer and the hard layer.

Referring to FIG. 3, an alloy region 50 is formed between the copper plating layer 20 and the hard layer 30. The alloy region 50 contains a metal element that constitutes the copper plating layer 20 and a metal element that constitutes the hard layer 30. The alloy region 50 is formed in the interface between the copper plating layer 20 and the hard layer 30. In other words, the copper plating layer 20 and the hard layer 30 are disposed in contact with each other in such a manner that the alloy region is formed in the interface between the copper plating layer 20 and the hard layer 30.

The canted coil spring 2 according to the embodiment includes the core wire 10. The core wire 10 is formed of steel having a pearlite structure and a suitable composition and has high strength. This configuration can ensure high settling resistance. The outer circumferential surface 11 of the core wire 10 is covered with the copper plating layer 20, which is formed of copper or a copper alloy. The copper plating layer 20 has a crystallite size of 220±50 Å. When the copper plating layer 20 has a crystallite size of 220±50 Å, the conductivity is high enough. As a result, the canted coil spring 2 according to the embodiment has both settling resistance and conductivity.

In the canted coil spring 2 according to the embodiment, the hard layer 30 is disposed on the outer circumferential side of the copper plating layer 20. It is not necessary to form the hard layer 30, but the presence of the hard layer 30 can suppress a decrease in conductivity due to fatigue fracture of the copper plating layer 20 to provide stable conductivity.

In the canted coil spring 2 according to the embodiment, the alloy region 50 is formed between the copper plating layer 20 and the hard layer 30. It is not necessary to form the alloy region 50, but the presence of the alloy region 50 allows the copper plating layer 20 and the hard layer 30 to be strongly bonded to each other.

The surface layer 40 is disposed on the hard layer 30 of the canted coil spring 2 according to the embodiment so as to include the outer circumferential surface of the canted coil spring-wire material 1 constituting the canted coil spring 2. It is not necessary to form the surface layer 40, but the presence of the surface layer 40 can reduce the contact resistance of the canted coil spring 2 when the canted coil spring 2 is used as a contact component (a component of a connector).

In the canted coil spring 2, the copper plating layer 20 preferably has a lattice strain of −0.085±0.015%. With this lattice strain, it is easy to ensure high conductivity.

In the canted coil spring 2, the copper plating layer 20 preferably has a hardness of 75 HV or more and 130 HV or less. With this lattice strain, it is easy to ensure high conductivity. The copper plating layer 20 more preferably has a hardness of 90 HV or more and 110 HV or less.

The steel constituting the core wire 10 may further contain one or more elements selected from the group consisting of 0.1 mass % or more and 0.4 mass % or less nickel, 0.1 mass % or more and 1.8 mass % or less chromium, 0.1 mass % or more and 0.4 mass % or less molybdenum, and 0.05 mass % or more and 0.3 mass % or less vanadium. Even when the core wire 10 formed of steel having such a composition is used, both settling resistance and conductivity can be obtained.

The silicon content of the steel constituting the core wire 10 may be 1.35 mass % or more and 2.3 mass % or less. When the silicon content is 1.35 mass % or more, it is possible to suppress softening in the strain relieving heat treatment. When the silicon content is 2.3 mass % or less, it is possible to suppress a decrease in toughness.

The steel constituting the core wire 10 may contain 0.6 mass % or more and 1.0 mass % or less carbon, 0.12 mass % or more and 0.32 mass % or less silicon, and 0.3 mass % or more and 0.9 mass % or less manganese, with the balance being iron and inevitable impurities.

The steel constituting the core wire 10 may contain 0.6 mass % or more and 1.0 mass % or less carbon, 0.7 mass % or more and 1.0 mass % or less silicon, and 0.3 mass % or more and 0.9 mass % or less manganese, with the balance being iron and inevitable impurities.

The steel constituting the core wire 10 may contain 0.55 mass % or more and 0.7 mass % or less carbon, 1.35 mass % or more and 2.3 mass % or less silicon, 0.3 mass % or more and 0.9 mass % or less manganese, 0.2 mass % or more and 1.8 mass % or less chromium, and 0.05 mass % or more and 0.30 mass % or less vanadium, with the balance being iron and inevitable impurities.

A large non-linear region can be obtained more assuredly by using steel having such a composition as the steel constituting the core wire 10.

The oxygen concentration in the interface between the core wire 10 and the copper plating layer 20 is preferably 10 mass % or less. With this oxygen concentration, a large non-linear region can be obtained more assuredly. The oxygen concentration in the interface between the core wire 10 and the copper plating layer 20 can be determined by, for example, performing quantitative analysis through EDS (energy dispersive X-ray spectrometry) on a square region, 300 µm on each side, of the cross section including the interface between the core wire 10 and the copper plating layer 20, the cross section being perpendicular to the longitudinal direction of the canted coil spring-wire material 1.

The hard layer 30 preferably has a hardness of 300 HV or more. With this hardness, stable conductivity can be achieved more assuredly. The hardness of the hard layer 30 is preferably 50 HV or more higher than the hardness of the copper plating layer 20. In this case, stable conductivity can be achieved more assuredly. The hardness of the hard layer 30 may be equal to or lower than the hardness of the core wire 10. The hardness (Vickers hardness) can be determined under the conditions of a load of 50 g and a retention time of 10 seconds. The hard layer 30 may have a thickness of, for example, 1 µm or more and 50 µm or less.

The ratio of the thickness of the hard layer 30 to the thickness of the copper plating layer 20 is preferably 1/10 or more and less than 1. When the ratio is 1/10 or more, stable conductivity can be achieved more assuredly. When the ratio is less than 1, the decrease of production efficiency can be avoided.

The hard layer 30 is preferably a plating layer. In this case, it is easy to form the hard layer 30.

The hard layer 30 is preferably a nickel layer or a chromium layer. The material of the hard layer 30 is preferably nickel or chromium, which has high strength and high conductivity.

The hard layer 30 is particularly preferably a nickel layer. It is easy to form the nickel layer or the chromium layer by plating. In other words, the hard layer 30 may be a nickel plating layer or a chromium plating layer.

The canted coil spring 2 preferably has a conductivity of 15% IACS or more and 50% IACS or less. The canted coil spring 2 having a conductivity in this range is suitable for a contact component.

When the hard layer 30 is a nickel layer, the alloy region 50 preferably contains copper and nickel. When the hard layer 30 is a nickel layer, the alloy region 50 is preferably a Cu-Ni alloy region. In this case, the copper plating layer 20 and the hard layer 30 are strongly bonded to each other.

The copper plating layer 20 preferably has a thickness of 10 µm or more and 65 µm or less. When the copper plating layer 20 has a thickness of 10 µm or more, it is easy to obtain sufficient conductivity. When the copper plating layer 20 has a thickness of 65 µm or less, it is easy to obtain high strength and high elastic limit. As a result, it is easy to obtain a large non-linear region.

The core wire 10 preferably has a diameter of 0.05 mm or more and 2.0 mm or less.

Figure 4:
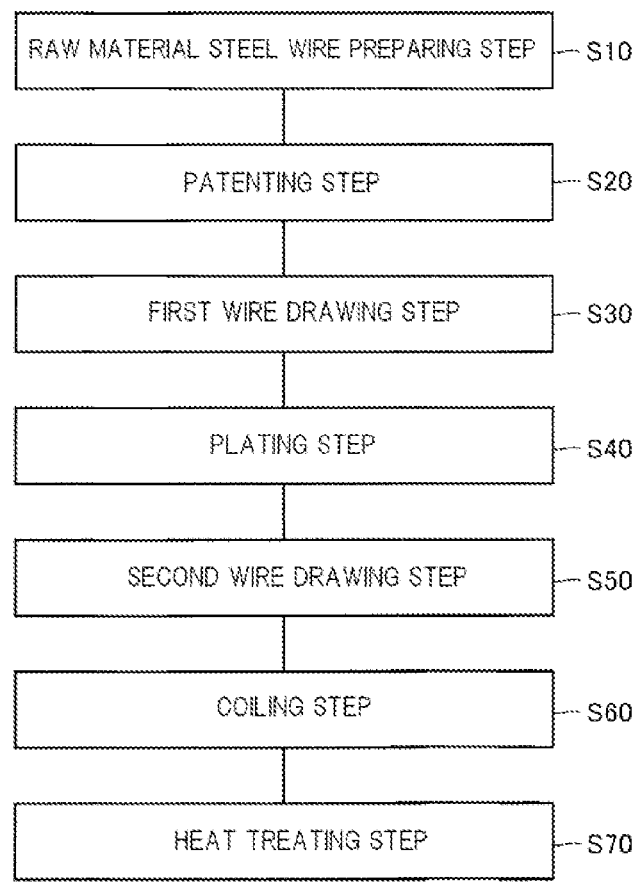
FIG. 4 is a flow chart illustrating the outline of a method for manufacturing a canted coil spring.

Next, an example method for manufacturing the canted coil spring 2 will be described. Referring to FIG. 4, a raw material steel wire preparing step is first performed as a step (S10) in the method for manufacturing the canted coil spring 2 according to the embodiment. In the step (S10), a steel wire to serve as the core wire 10 is prepared. Specifically, a steel wire formed of steel having the following composition is prepared: 0.5 mass % or more and 1.0 mass % or less carbon, 0.1 mass % or more and 2.5 mass % or less silicon, and 0.3 mass % or more and 0.9 mass % or less manganese, with the balance being iron and inevitable impurities. The steel constituting the steel wire may further contain one or more elements selected from the group consisting of 0.1 mass % or more and 0.4 mass % or less nickel, 0.1 mass % or more and 1.8 mass % or less chromium, 0.1 mass % or more and 0.4 mass % or less molybdenum, and 0.05 mass % or more and 0.3 mass % or less vanadium.

Next, a patenting step is performed as a step (S20). In the step (S20), patenting is performed on the raw material steel wire prepared in the step (S10).

Specifically, patenting is a heat treatment that involves heating the raw material steel wire to a temperature range of the austenitizing temperature ($A_1$ point) or higher; quenching the heated raw material steel wire to a temperature range higher than the martensite transformation start temperature ($M_s$ point); and maintaining the quenched raw material steel wire in this temperature range. Accordingly, the metal structure of the raw material steel wire is transformed into a fine pearlite structure with fine interlamellar spacing. In the patenting treatment, the treatment involving heating the raw material steel wire to the temperature range of $A_1$ point or higher is preferably performed in an inert gas atmosphere in order to suppress occurrence of decarburization.

Figure 5:
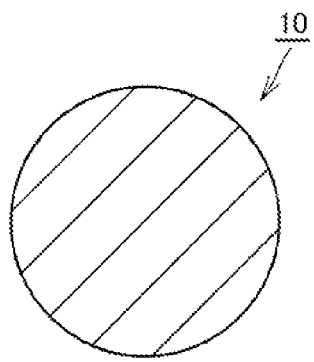
FIG. 5 is a schematic cross-sectional view for describing the method for manufacturing a canted coil spring.

Next, a first wire drawing step is performed as a step (S30). In the step (S30), the raw material steel wire that has undergone patenting in the step (S20) is subjected to a wire drawing process (drawing process). Referring to FIG. 5, this process provides the core wire 10, which has a pearlite structure and has a circular cross section perpendicular to the longitudinal direction.

Figure 6:
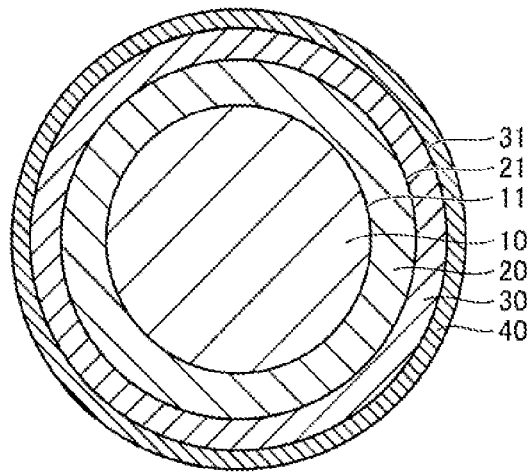
FIG. 6 is a schematic cross-sectional view for describing the method for manufacturing a canted coil spring.

Next, a plating step is performed as a step (S40). Referring to FIG. 5 and FIG. 6, in the step (S40), plural plating layers are formed so as to cover the outer circumferential surface 11 of the core wire 10 obtained in the step (S30). First, the copper plating layer 20, which is formed of copper or a copper alloy, is formed. The thickness of the copper plating layer 20 formed in the step (S40) is, for example, 30 µm or more and 90 µm or less. Next, the hard layer 30 is formed on the copper plating layer 20. Specifically, a nickel plating layer or chromium plating layer serving as the hard layer 30 is formed by performing nickel plating or chromium plating. Next, the surface layer 40 is formed on the hard layer 30. Specifically, a gold plating layer, silver plating layer, or tin plating layer serving as the surface layer 40 is formed on the hard layer 30. Accordingly, the copper plating layer 20, the hard layer 30, and the surface layer 40 are formed on the core wire 10 as illustrated in FIG. 6.

Next, a second wire drawing step is performed as a step (S50). Referring to FIG. 6 and FIG. 1, in the step (S50), the core wire 10 having the copper plating layer 20, the hard layer 30, and the surface layer 40 formed in the step (S40) is subjected to a wire drawing process. This process provides the canted coil spring-wire material 1 having a wire diameter suitable for a desired canted coil spring 2. Through the above procedure, the manufacture of the canted coil spring-wire material 1 according to the embodiment is complete. A method for manufacturing the canted coil spring 2 including the canted coil spring-wire material 1 will be described below.

Next, a coiling step is performed as a step (S60). Referring to FIG. 1 and FIG. 2, in the step (S60), the canted coil spring-wire material 1 obtained in the step (S50) is processed into the shape of the canted coil spring 2. Specifically, the canted coil spring-wire material 1 is processed into a helical shape to form the shape of the canted coil spring 2.

Next, a heat treating step is performed as a step (S70). In the step (S70), the canted coil spring-wire material 1 formed into the shape of the canted coil spring 2 in the step (S60) is subjected to a heat treatment. The step (S70) is intended to reduce the strain introduced into the canted coil spring 2 by the process in the step (S60) and control the crystallite size, the lattice strain, and the hardness of the copper plating layer. The heating temperature in the step (S70) is 150° C. or higher and 300° C. or lower. This process can reduce the strain introduced into the canted coil spring 2 and control the crystallite size, the lattice strain, and the hardness of the copper plating layer in suitable ranges. The heating temperature in the step (S70) is preferably 220° C. or higher. The heating temperature in the step (S70) is preferably 275° C. or lower. In general, the heat treatment for reducing the strain introduced into the canted coil spring is performed at a temperature over 300° C. In the step (S70) in the embodiment, however, the heat treatment temperature of 150° C. or higher and 300° C. or lower is selected in view of the balance between the reduction of the strain and the control of the crystallite size, the lattice strain, and the hardness of the copper plating layer. Through the above procedure, the manufacture of the canted coil spring 2 according to the embodiment is complete. In the embodiment, the case where the hard layer 30 and the surface layer 40 are formed in the step (S40) is described. However, the hard layer 30 and the surface layer 40 may be formed, for example, after the step (S70).

Figure 7:
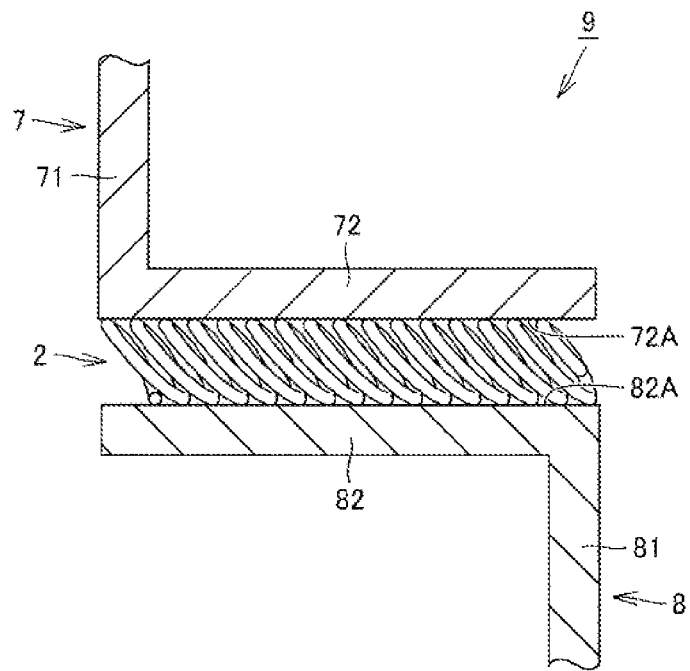
FIG. 7 is a schematic cross-sectional view illustrating the structure of a connector.

Next, a connector according to an embodiment will be described. Referring to FIG. 7, a connector 9 according to the embodiment includes: a first terminal 7; a second terminal 8 spaced apart from the first terminal 7; and the canted coil spring 2 according to the above embodiment disposed between the first terminal 7 and the second terminal 8 in such a manner that the canted coil spring 2 is in contact with the first terminal 7 and the second terminal 8. The first terminal 7 and the second terminal 8 are formed of an electrical conductor. The first terminal 7 and the second terminal 8 are, for example, busbars.

The first terminal 7 includes a first region 71 and a second region 72. The second region 72 is connected to the first region 71 and extends in the direction that intersects the first region 71. The second terminal 8 includes a first region 81 and a second region 82. The second region 82 is connected to the first region 81 and extends in the direction that intersects the first region 81. The first terminal 7 and the second terminal 8 are disposed in such a manner that a contact surface 72A included in the second region 72 faces a contact surface 82A included in the second region 82. The canted coil spring 2 is disposed in such a manner that the axial direction of the canted coil spring 2 is along the contact surface 72A and the contact surface 82A and the canted coil spring 2 is in contact with the contact surface 72A and the contact surface 82A.

In the connector 9, the first terminal 7 and the second terminal 8 are thus electrically coupled to each other through the canted coil spring 2 having both settling resistance and conductivity. In the connector 9 according to the embodiment, the canted coil spring 2 stably absorbs changes in the distance between the first terminal 7 and the second terminal 8 and forms an electrical coupling between the first terminal 7 and the second terminal 8 with low resistance.

EXAMPLE

The experiments for determining the characteristics of the canted coil spring according to one aspect of the present invention were carried out. The experimental procedure is as described below.

Experiment 1

The canted coil spring 2 was produced by the same procedure as in the embodiment. The material of the copper plating layer 20 was copper (pure copper). The area fraction of the copper plating layer 20 in the cross section perpendicular to the longitudinal direction of the canted coil spring-wire material 1 constituting the canted coil spring 2 was 25% (design conductivity: 25% IACS) (Example). For comparison, a canted coil spring having the same shape was produced by using a zirconium-copper alloy as a material (Comparative Example). The canted coil springs of Example and Comparative Example were compressed in the direction perpendicular to the axial direction under heating to 150° C., and maintained for 100 hours. Subsequently, the load for compression was relieved, and the residual shearing strain was calculated from the shape of the canted coil spring before and after compression. The experimental results are shown in FIG. 8.

When the canted coil spring 2 is used in the connector 9 described on the basis of FIG. 7 in the embodiment, a desired value of the residual shearing strain due to the compression can be set to, for example, 0.05 or less.

Figure 8:
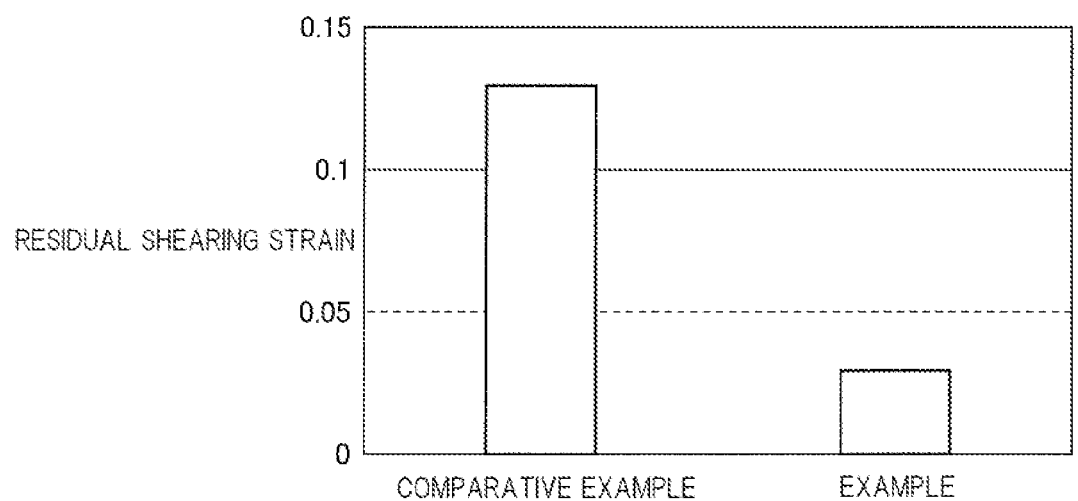
FIG. 8 illustrates the results of the settling resistance test.

Referring to FIG. 8, the residual shearing strain of the canted coil spring of Comparative Example produced by using a zirconium-copper alloy as a material greatly exceeds 0.05. However, the residual shearing strain of the canted coil spring of Example of the present invention is less than 0.05. This indicates that the canted coil spring of the present invention has high settling resistance.

Experiment 2

The relationship between the crystallite size of the copper plating layer 20 and the conductivity was investigated by changing the crystallite size of the copper plating layer 20 in the canted coil spring having a design conductivity of 50% IACS and the canted coil spring having a design conductivity of 25% IACS. The crystallite size was controlled by changing the heat treatment temperature in the step (S70) by the same procedure as in the embodiment. The lattice strain and the hardness of the copper plating layer 20 in these canted coil springs were also determined, and the relationships between these parameters and the conductivity were also investigated. The conductivity was determined by four-terminal sensing using 3522 LCR HiTESTER available from Hioki E.E. Corporation. The hardness was measured by using a Vickers hardness tester under the conditions of a load of 50 g and a retention time of 5 seconds. The crystallite size and the lattice strain were determined by X-ray diffraction analysis (wide-angle measurement, X-ray used: Cu—K$\alpha$, excitation conditions: 45 kV to 40 mA, scanning method: $\theta$ to $2\theta$, step width: 0.03°, integration time: 1 second, diffraction angle measurement range: 40° to 140°) using an X-ray diffractometer (X'pert) available from Yamato Scientific Co., Ltd. The experimental results are shown in FIG. 9 to FIG. 16.

Figure 9:
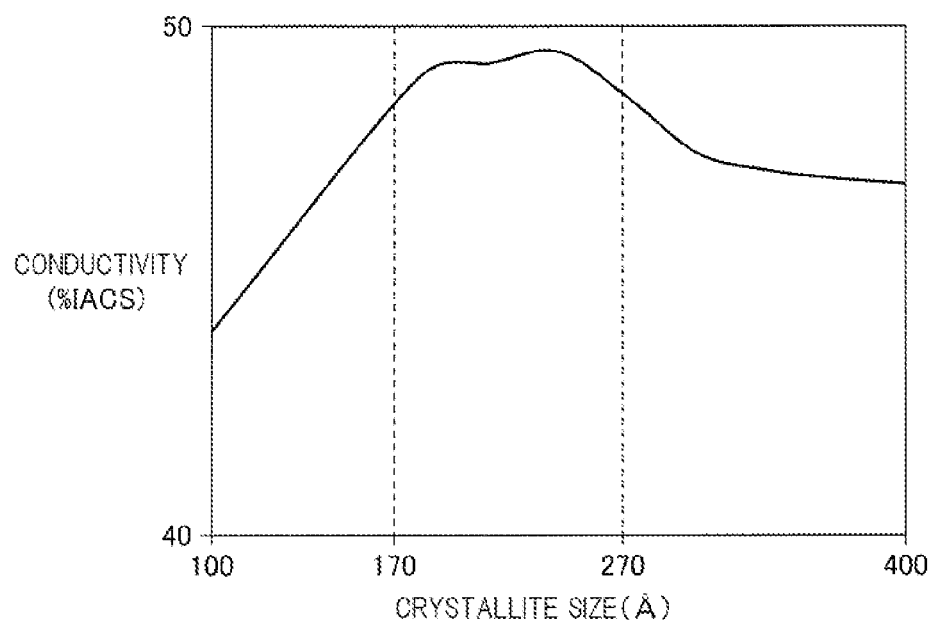
FIG. 9 illustrates the relationship between the crystallite size and the conductivity for 50% IACS design conductivity.
Figure 10:
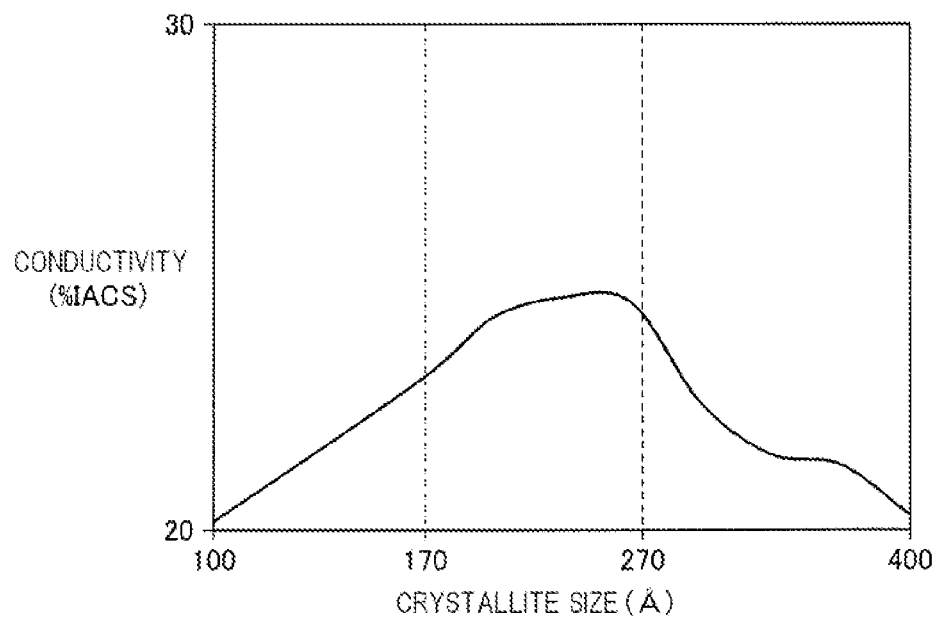
FIG. 10 illustrates the relationship between the crystallite size and the conductivity for 25% IACS design conductivity.

FIG. 9 illustrates the relationship between the crystallite size and the conductivity for 50% IACS design conductivity. FIG. 10 illustrates the relationship between the crystallite size and the conductivity for 25% IACS design conductivity. Referring to FIG. 9 and FIG. 10, the conductivity increases and then decreases as the crystallite size increases for both 50% IACS design conductivity and 25% IACS design conductivity. In both cases, the conductivity reaches the maximum value when the crystallite size is in the range of 220±50 Å (170 Å or more and 270 Å or less). This indicates that high conductivity is ensured when the crystallite size of the copper plating layer is the range of 220±50 Å.

Figure 11:
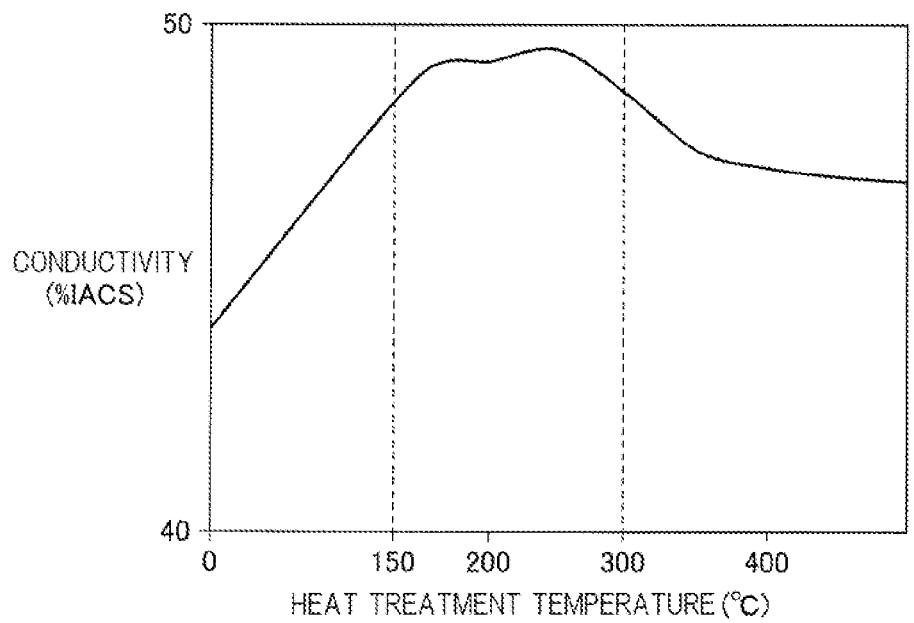
FIG. 11 illustrates the relationship between the heat treatment temperature and the conductivity for 50% IACS design conductivity.
Figure 12:
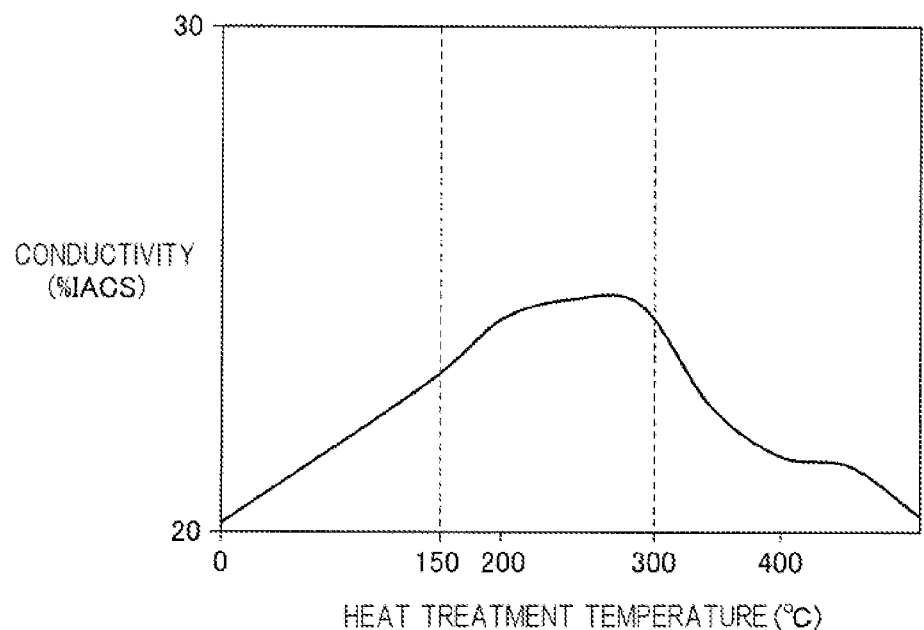
FIG. 12 illustrates the relationship between the heat treatment temperature and the conductivity for 25% IACS design conductivity.

FIG. 11 illustrates the relationship between the heat treatment temperature and the conductivity in the step (S70) for 50% IACS design conductivity. FIG. 12 illustrates the relationship between the heat treatment temperature and the conductivity in the step (S70) for 25% IACS design conductivity. FIG. 11 and FIG. 12 show that the heat treatment temperature in the step (S70) for obtaining the crystallite size in the range of 220±50 Å is 150° C. or higher and 300° C. or lower. As described above, the heat treatment for reducing the strain introduced into the canted coil spring is normally performed at a temperature over 300° C.

However, this experimental results show that the heat treatment temperature of 150° C. or higher and 300° C. or lower is appropriate for obtaining a suitable crystallite size in the copper plating layer 20.

Figure 13:
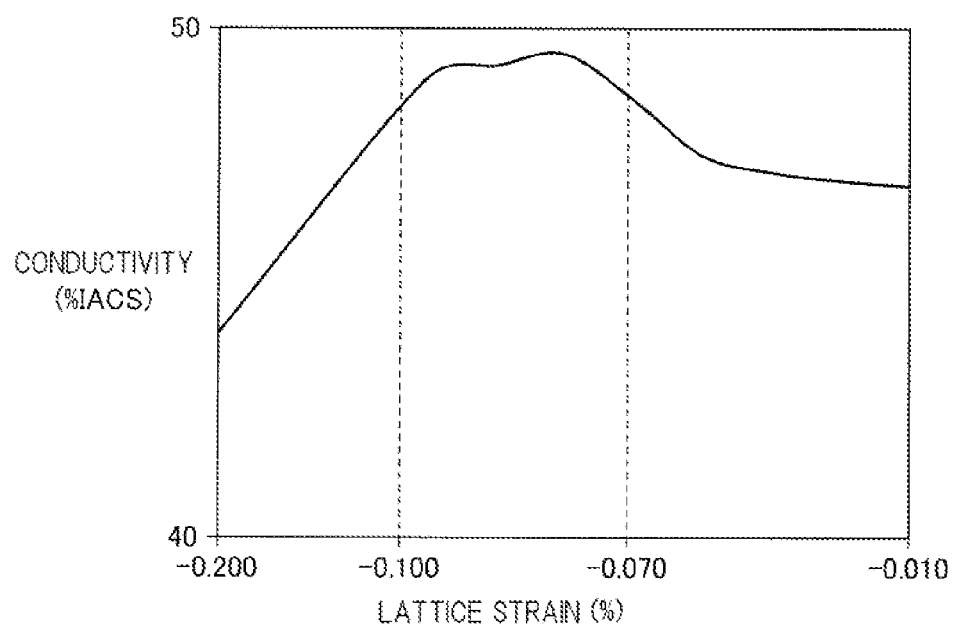
FIG. 13 illustrates the relationship between the lattice strain and the conductivity for 50% IACS design conductivity.
Figure 14:
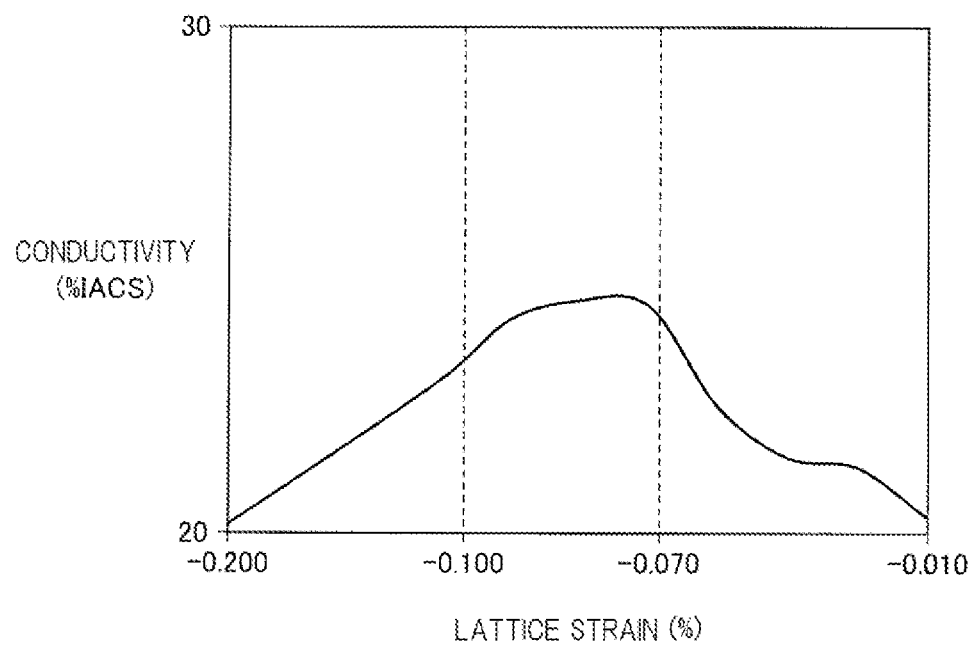
FIG. 14 illustrates the relationship between the lattice strain and the conductivity for 25% IACS design conductivity.

FIG. 13 illustrates the relationship between the lattice strain and the conductivity for 50% IACS design conductivity. FIG. 14 illustrates the relationship between the lattice strain and the conductivity for 25% IACS design conductivity. Referring to FIG. 13 and FIG. 14, the conductivity reaches the maximum value when the lattice strain is in the range of −0.085±0.015% (−0.100% or more and −0.070% or less). This indicates that high conductivity is ensured when the lattice strain of the copper plating layer is the range of −0.085±0.015%.

Figure 15:
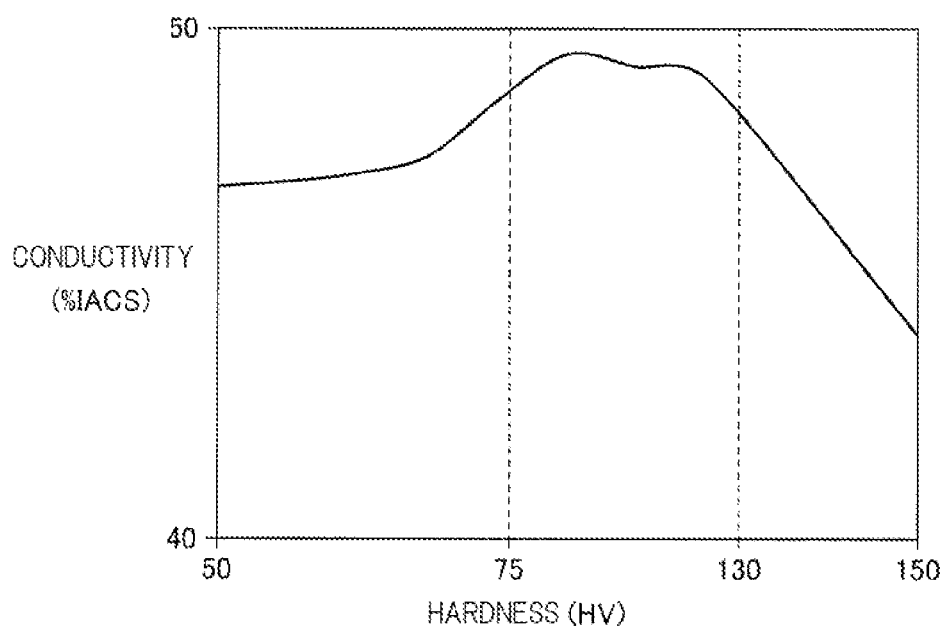
FIG. 15 illustrates the relationship between the hardness and the conductivity for 50% IACS design conductivity.

FIG. 15 illustrates the relationship between the hardness and the conductivity for 50% IACS design conductivity.

Figure 16:
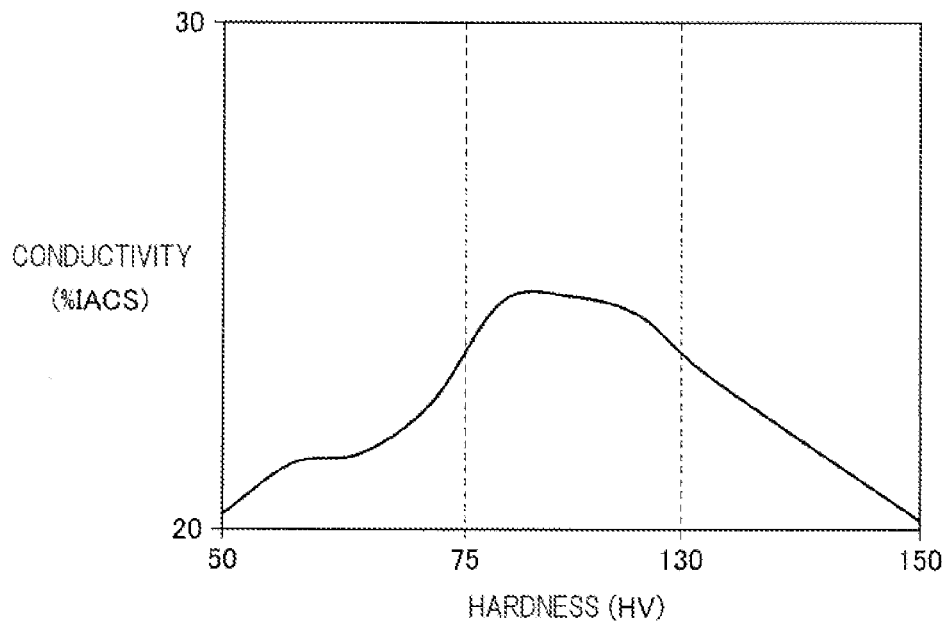
FIG. 16 illustrates the relationship between the hardness and the conductivity for 25% IACS design conductivity.

FIG. 16 illustrates the relationship between the hardness and the conductivity for 25% IACS design conductivity. Referring to FIG. 15 and FIG. 16, the conductivity reaches the maximum value when the hardness is in the range of 75 HV or more and 130 HV or less. This indicates that high conductivity is ensured when the hardness of the copper plating layer is 75 HV or more and 130 HV or less.

Experiment 3

The experiment for investigating the relationship between the resistance and the load when the canted coil spring 2 was pressed against the terminals as in the connector 9 illustrated in FIG. 7 was carried out by changing the heat treatment condition of the step (S70) in the embodiment.

Figure 17:
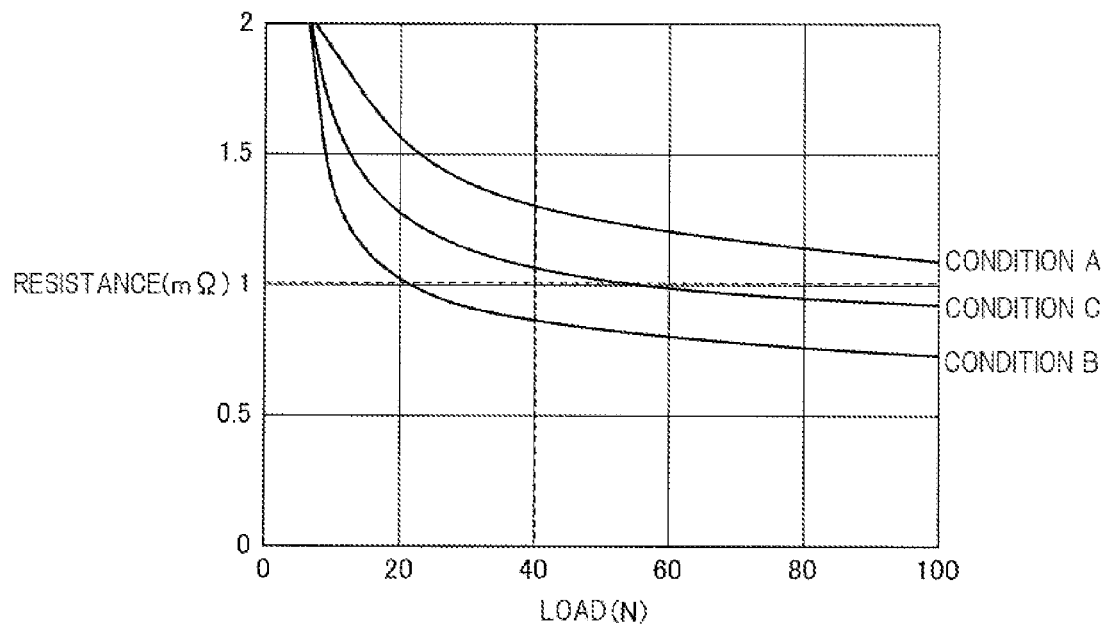
FIG. 17 illustrates the relationship between the load and the resistance for 50% IACS design conductivity.

FIG. 17 illustrates the relationship between the load and the resistance for 50% IACS design conductivity.

Figure 18:
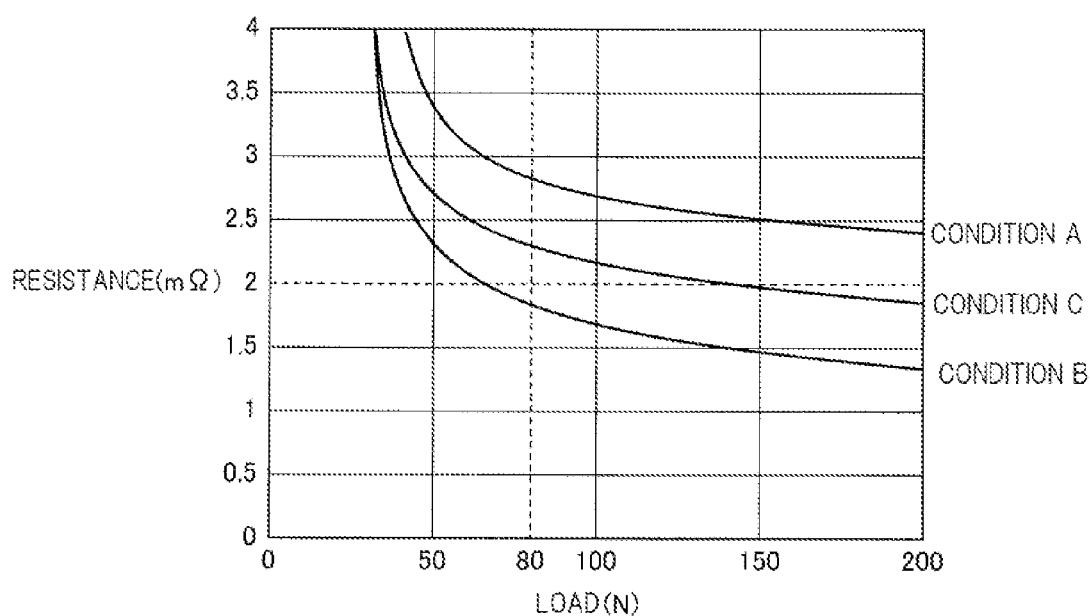
FIG. 18 illustrates the relationship between the load and the resistance for 25% IACS design conductivity.

FIG. 18 illustrates the relationship between the load and the resistance for 25% IACS design conductivity. In FIG. 17 and FIG. 18, the condition A indicates that no heat treatment was performed in the step (S70), the condition B indicates that the heat treatment at 250° C. for providing the copper plating layer 20 having a crystallite size of 170 Å or more and 270 Å or less was preformed, and the condition C indicates that the heat treatment at 400° C. for providing the copper plating layer 20 having a crystallite size over 270 Å was performed.

For design conductivity 50% IACS, a desired value of the resistance can be set to 1 mΩ or less under a load in the range of 40 N or less. Referring to FIG. 17, for the condition A with no heat treatment, the canted coil spring 2 has a low conductivity, and the resistance cannot reach 1 mΩ or less. For the condition C where the crystallite size is over 270 Å, the resistance can reach 1 mΩ or less under high load, but the resistance cannot be lowered sufficiently under a load of 40 N or less. However, for the condition B where the crystallite size is 170 Å or more and 270 Å or less, the resistance can reach 1 mΩ or less under a load of 40 N or less.

For design conductivity 25% IACS, a desired value of the resistance can be set to 2 mΩ or less when the load is in the range of 80 N or less. Referring to FIG. 18, for the condition A with no heat treatment, the canted coil spring 2 has a low conductivity, and the resistance cannot reach 2 mΩ or less. For the condition C where the crystallite size is over 270 Å, the resistance can reach 2 mΩ or less under high load, but the resistance cannot be lowered sufficiently under a load of 80 N or less. However, for the condition B where the crystallite size is 170 Å or more and 270 Å or less, the resistance can reach 2 mΩ or less under a load of 80 N or less.

These results show that a canted coil spring suitable for a component of a connector can be provided when the crystallite size of the copper plating layer is in the range of 220±50 Å.

It should be understood that the embodiments and Example disclosed herein are illustrative in any respect and non-restrictive from any viewpoint. The scope of the present invention is defined by the claims, rather than the above description, and is intended to include all modifications within the meaning and range of equivalency of the claims.

REFERENCE SIGNS LIST

1 Canted coil spring-wire material
2 Canted coil spring
7 First terminal
8 Second terminal
9 Connector
10 Core wire
11 Outer circumferential surface
20 Copper plating layer
21 Outer circumferential surface
30 Hard layer
31 Outer circumferential surface
40 Surface layer
50 Alloy region
71 First region
72 Second region
72A Contact surface
81 First region
82 Second region
82A Contact surface

The invention claimed is:

1. A canted coil spring comprising:
a core wire formed of steel having a pearlite structure; and
a copper plating layer formed of a copper alloy covering an outer circumferential surface of the core wire;
wherein the steel contains 0.5 mass % or more and 1.0 mass % or less carbon, 0.1 mass % or more and 2.5 mass % or less silicon, and 0.3 mass % or more and 0.9 mass % or less manganese, with the balance being iron and inevitable impurities,
the copper plating layer has a crystallite size of 220±50 Å,
the copper plating layer has a lattice strain of −0.085±0.015%, and
an oxygen concentration in an interface between the core wire and the copper plating layer is 10 mass % or less.

2. The canted coil spring according to claim 1, wherein the copper plating layer has a hardness of 75 HV or more and 130 HV or less.

3. The canted coil spring according to claim 1, wherein the steel further contains one or more elements selected from the group consisting of 0.1 mass % or more and 0.4 mass % or less nickel, 0.1 mass % or more and 1.8 mass % or less chromium, 0.1 mass % or more and 0.4 mass % or less molybdenum, and 0.05 mass % or more and 0.3 mass % or less vanadium.

4. The canted coil spring according to claim 1, further comprising a hard layer disposed on an outer circumferential side of the copper plating layer and having a higher hardness than the copper plating layer.

5. The canted coil spring according to claim 4, wherein the hard layer is a plating layer.

6. The canted coil spring according to claim 4, wherein the hard layer is a nickel layer or a chromium layer.

7. The canted coil spring according to claim 4, wherein the hard layer has a hardness of 300 HV or more.

8. The canted coil spring according to claim 4, wherein the hardness of the hard layer is 50 HV or more higher than the hardness of the copper plating layer.

9. The canted coil spring according to claim 4, wherein a ratio of a thickness of the hard layer to a thickness of the copper plating layer is 1/10 or more and less than 1.

10. The canted coil spring according to claim 4, wherein an alloy region containing a metal element that constitutes the copper plating layer and a metal element that constitutes the hard layer is formed between the copper plating layer and the hard layer.

11. The canted coil spring according to claim 10, wherein the hard layer is a nickel layer, and
the alloy region contains copper and nickel.

12. The canted coil spring according to claim 1, wherein the canted coil spring has a conductivity of 15% IACS or more and 50% IACS or less.

13. The canted coil spring according to claim 1, further comprising a gold layer, a silver layer, or a tin layer on a surface of the canted coil spring.

14. A connector comprising:
a first terminal;
a second terminal spaced apart from the first terminal; and
the canted coil spring according to claim 1 disposed between the first terminal and the second terminal in such a manner that the canted coil spring is in contact with the first terminal and the second terminal.

15. The canted coil spring according to claim 1, wherein the copper alloy consists of copper and at least one of zinc, tin, or phosphorus.

16. The canted coil spring according to claim 1, wherein the copper plating layer has a thickness of 10 μm or more and 65 μm or less.

17. The canted coil spring according to claim 1, wherein the steel contains 1.35 mass % or more and 2.3 mass % or less silicon.

* * * * *